US011919181B2

(12) United States Patent
Van Veldhuizen

(10) Patent No.: US 11,919,181 B2
(45) Date of Patent: Mar. 5, 2024

(54) DOUBLE-SIDED COMB FOR A HAIR-CUTTING DEVICE

(71) Applicant: KONINKLIJKE PHILIPS N.V., Eindhoven (NL)

(72) Inventor: Gijsbert Hendrik Van Veldhuizen, Groningen (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 277 days.

(21) Appl. No.: 17/311,704

(22) PCT Filed: Jan. 13, 2020

(86) PCT No.: PCT/EP2020/050620
§ 371 (c)(1),
(2) Date: Jun. 8, 2021

(87) PCT Pub. No.: WO2020/151967
PCT Pub. Date: Jul. 30, 2020

(65) Prior Publication Data

US 2022/0024060 A1 Jan. 27, 2022

(30) Foreign Application Priority Data

Jan. 22, 2019 (EP) .................................... 19153003

(51) Int. Cl.
*B26B 19/20* (2006.01)
*A45D 24/10* (2006.01)
(Continued)

(52) U.S. Cl.
CPC .............. *B26B 19/20* (2013.01); *A45D 24/10* (2013.01); *A45D 24/36* (2013.01);
(Continued)

(58) Field of Classification Search
CPC ....... B26B 19/20; B26B 19/205; B26B 19/22; B26B 19/38; B26B 19/3806;
(Continued)

(56) References Cited

U.S. PATENT DOCUMENTS 166,772 A * 8/1875 Harlow .................. B26B 19/20 30/200
302,734 A * 7/1884 Jobson .................. A45D 24/36 132/142
(Continued)

FOREIGN PATENT DOCUMENTS

CN 206277422 U 6/2017
DE 3623591 A1 1/1988
(Continued)

OTHER PUBLICATIONS

International Search Report and Written Opinion dated Mar. 26, 2020 for International Application No. PCT/EP2020/050620 Filed Jan. 13, 2020.

*Primary Examiner* — Jason Daniel Prone

(57) ABSTRACT

The invention relates to a comb (100) for being attached to a hair-cutting device (115). The comb includes two surfaces (103, 104) to be in contact with the skin of the user. Each surface includes a slot (105, 106) for attaching the comb to the hair-cutting device, and both surfaces have a common edge (107). When the hair-cutting device is attached to the slot of the first surface, the second surface is in contact with the skin, and when the hair-cutting device is attached to the slot of the second surface, the first surface is in contact with the skin. An asymmetric arrangement of the two slots allows for two cutting lengths of hair with one double-sided comb.

12 Claims, 6 Drawing Sheets

(51) Int. Cl.
*A45D 24/36* (2006.01)
*B26B 19/38* (2006.01)
*B26B 21/42* (2006.01)

(52) U.S. Cl.
CPC ...... *B26B 19/3813* (2013.01); *B26B 19/3826* (2013.01); *B26B 21/42* (2013.01)

(58) Field of Classification Search
CPC ............ B26B 19/3813; B26B 19/3826; B26B 21/4037; B26B 21/42; A45D 24/10; A45D 24/36
USPC ........................ 30/233.5; D28/46, 49, 53, 54
See application file for complete search history.

(56) References Cited

U.S. PATENT DOCUMENTS

| | | | | |
|---|---|---|---|---|
| 1,807,811 | A | 6/1931 | Van Ostel | |
| 2,715,266 | A | 8/1955 | Haislip | |
| 2,778,366 | A * | 1/1957 | Richmond | A45D 24/36 132/213.1 |
| 2,807,876 | A | 10/1957 | Barone | |
| 3,149,418 | A * | 9/1964 | Milbourne | B26B 19/20 30/201 |
| 4,131,995 | A * | 1/1979 | Pires | B26B 19/20 30/200 |
| 5,050,305 | A * | 9/1991 | Baker | B26B 19/20 30/233.5 |
| 5,579,581 | A * | 12/1996 | Melton | B26B 19/3813 30/223 |
| 5,937,526 | A * | 8/1999 | Wahl | B26B 19/20 30/200 |
| 6,807,736 | B2 * | 10/2004 | Langley | B26B 19/20 30/123 |
| 7,536,789 | B2 * | 5/2009 | Michel | B26B 19/3813 30/233.5 |
| D630,377 | S * | 1/2011 | Wattam | D28/53 |
| 7,954,244 | B2 * | 6/2011 | Orloff | B26B 21/42 30/77 |
| D756,565 | S * | 5/2016 | Andersson | D28/54 |
| D790,769 | S * | 6/2017 | Drori | D28/54 |
| 10,144,142 | B1 * | 12/2018 | Squires | B26B 21/42 |
| 10,293,500 | B1 * | 5/2019 | Baker | B26B 19/20 |
| 10,307,920 | B1 * | 6/2019 | Sanchez | B26B 19/20 |
| 10,702,999 | B2 | 7/2020 | Iaccarino | |
| D907,291 | S * | 1/2021 | Michelsen | D28/46 |
| 10,913,170 | B2 * | 2/2021 | Phoon | B26B 19/3813 |
| 10,967,530 | B2 * | 4/2021 | Eijkelkamp | B26B 19/38 |
| D928,405 | S * | 8/2021 | Huang | D28/53 |
| 11,235,480 | B2 * | 2/2022 | Eijkelkamp | B26B 19/3813 |
| 11,364,646 | B2 * | 6/2022 | Iaccarino | B26B 19/20 |
| 11,400,610 | B2 * | 8/2022 | Moustakas | B26B 21/4037 |
| 11,491,668 | B2 * | 11/2022 | Psimadas | B26B 21/42 |
| 11,738,474 | B2 * | 8/2023 | Van Veldhuizen | B26B 19/20 30/201 |
| 2019/0299460 | A1 * | 10/2019 | Lechuga | B26B 21/42 |
| 2022/0040872 | A1 * | 2/2022 | Pandis | A45D 24/36 |
| 2022/0339809 | A1 * | 10/2022 | Ochiai | B26B 21/42 |
| 2023/0120418 | A1 * | 4/2023 | Chang | B26B 21/4037 30/51 |
| 2023/0202063 | A1 * | 6/2023 | Van Veldhuizen | B26B 19/205 30/201 |

FOREIGN PATENT DOCUMENTS

| | | | | |
|---|---|---|---|---|
| EP | 3685972 | A1 * | 7/2020 | B26B 19/20 |
| JP | S60106583 | U | 7/1985 | |
| JP | 2001232075 | A | 8/2001 | |
| JP | 2002315977 | A | 10/2002 | |
| WO | 2005/103589 | A1 | 10/2006 | |

* cited by examiner

DOUBLE-SIDED COMB FOR A HAIR-CUTTING DEVICE

CROSS REFERENCE TO RELATED APPLICATIONS

This application is the U.S. National Phase application under 35 U.S.C. § 371 of International Application No. PCT/EP2020/050620 filed Jan. 13, 2020, which claims the benefit of European Patent Application Number 19153003.9 filed Jan. 22, 2019. These applications are hereby incorporated by reference herein.

FIELD OF THE INVENTION

The present invention relates to a comb for being attached to a hair-cutting device, a hair-cutting device comprising such a comb, and a method of adapting a cutting length of a hair-cutting device with such a comb.

BACKGROUND OF THE INVENTION

The cutting length of hair is usually affected by a comb attached to the hair-cutting device. For obtaining different cutting lengths, a large number of combs can be provided, one comb for each cutting length. However, this leads to a plurality of add-on elements, which cannot be attached to the device at the same time. In addition, adjustable combs are known; however, these systems often provide a low mechanical stability and the risk of unintentional changing the cutting length.

There is a need to address this issue.

SUMMARY OF THE INVENTION

It would be advantageous to have an improved appliance for providing various cutting lengths for a hair-cutting device.

The object of the present invention is solved by the subject matter of the independent claims, wherein further embodiments are incorporated in the dependent claims.

The described embodiments similarly pertain to the comb for being attached to a hair-cutting device, to the hair-cutting device comprising a comb and to the method of adapting a cutting length of a hair-cutting device with a comb. Synergetic effects may arise from different combinations of the embodiments although they might not be described in detail.

Further on, it shall be noted that all embodiments of the present invention concerning a method, might be carried out with the order of the steps as described, nevertheless this has not to be the only and essential order of the steps of the method. The herein presented methods can be carried out with another order of the disclosed steps without departing from the respective method embodiment, unless explicitly mentioned to the contrary hereinafter.

According to a first aspect of the invention, there is provided a comb for being attached to a hair-cutting device. The comb comprises a first surface configured to be in contact with a skin of a user when the comb is attached to the hair-cutting device in a first attachment position. The first surface comprises a first slot configured to receive a cutting element of the hair-cutting device when the comb is attached to the hair-cutting device in a second attachment position. Further, the comb comprises a second surface configured to be in contact with the skin of the user when the comb is attached to the hair-cutting device in the second attachment position. The second surface comprises a second slot configured to receive the cutting element of the hair-cutting device when the comb is attached to the hair-cutting device in the first attachment position.

The comb is configured to be manually attached to the hair-cutting device. It is double-sided and can be attached to the hair-cutting device in two orientations using either the slot at the first side of the comb or the slot at the second side of the comb. Each of the two sides is configured to be in contact with the skin of the user in one of the respective attachment positions. The two sides are positioned at opposite sides of the comb, as can be gathered for example from the embodiments shown in FIGS. 1 to 6. With a primarily flat form of the comb, which can be established by an angle of less than 45 degrees between the first surface and the second surface, this can be regarded as a bottom and top configuration. The bottom side of the comb is in contact with the skin, and the top side of the comb is attached to the hair-cutting device. Thus, the respective side, which is not attached by means of the corresponding slot to the hair-cutting device, is configured to comb the hair, guide it to the cutting element of the hair-cutting device and to define a distance of the cutting element from the skin. This distance is equal to the length, to which the hair or beard growing on the skin of the user is to be reduced. Details about this distance will be elucidated with the exemplary embodiment of FIGS. 6*a* and 6*b*. Due to the asymmetric shape of the comb, preferably an asymmetric design or positioning of the two slots with respect to the corresponding surface, the comb is configured to offer two different cutting lengths of hair. By manually flipping the comb from the first attachment position to the second attachment position, the respective cutting length is adjusted. In this manner, one single add-on element can offer two cutting lengths, thus reducing the number of accessories of the hair-cutting device.

In an embodiment of the invention, the first surface and the second surface extend along the comb towards a common edge, and the common edge forms a tip of the comb.

Both, the first surface and the second surface terminate in the common edge, which is part of both surfaces in this embodiment of the invention. The common edge forms a tip of the comb and acts in both attachment positions as leading edge of the comb when moved across the skin of the user and through the hair on the skin. Such a common edge can be seen e.g. in FIGS. 1 and 2.

In an embodiment of the invention, the first slot is positioned in the first surface of the comb with a first distance from the common edge, the second slot is positioned in the second surface of the comb with a second distance from the common edge, and the first distance is different from the second distance.

The different distances of the first slot and the second slot, respectively, from the common edge of the comb induce in this embodiment of the invention also a change in distance of the respective slot from the skin of the user. The distance of the slot, which is attached to the hair-cutting device, from the skin defines the distance of the cutting element from skin and thus the cutting length of hair. By providing different distances of the two slots from the common edge of the comb, two possible cutting lengths are provided.

In an embodiment of the invention, the first surface has a first length, the second surface has a second length, and the first length is different from the second length.

In this manner, the geometrical shape of the comb accounts for the variation in the distance of the slots from the common edge. Adjusting the length of the surfaces, for example, allows a more centered attachment of the comb to the hair-cutting device, thus leading to a better user experience in this embodiment of the invention.

In an embodiment of the invention, the first slot has a first depth with respect to the first surface, the second slot has a second depth with respect to the second surface, and the first depth is equal to the second depth.

In this way, the cutting length of hair is defined solely by the distance of the respective slot from the common edge. The design of the two slots is identical, with only a different position at the respective surface. This enables a more comfortable attaching of the comb to the hair-cutting device. In addition, in this embodiment of the invention, the slots can be designed in order to optimize the hair catching and the guidance of the hair to the cutting element.

In an embodiment of the invention, the first slot has a first depth with respect to the first surface, the second slot has a second depth with respect to the second surface, and the first depth is different from the second depth.

In this manner, the depth of the respective slot can define the cutting length. By attaching the hair-cutting device to a deeper slot, also the cutting element is located deeper in the slot. Thus, the cutting element has a smaller distance to the opposite surface and the skin of the user, which leads to a smaller cutting length. In this embodiment of the invention, the distance of the two slots from the common edge can be identical.

In an embodiment of the invention, the comb has a wedge shape.

The two surfaces can be designed to have an angle between each other, which is greater than zero degrees and smaller than 90 degrees. The surfaces form this angle at the common edge. This angle enables the definition of the cutting length by the distance of the slot from the common edge, as a larger distance of the slot from the common edge results in a larger distance of the cutting element from skin.

In an embodiment of the invention, the first surface is parallel to the second surface.

The surfaces can be designed to be parallel to each other. In this way, the cutting length of the utilized attachment position is to be defined by the depth of the respective slot. In this embodiment of the invention, the comb can be designed flatter.

In an embodiment of the invention, the comb is configured when being attached in the first attachment position to the hair-cutting device to cause a first cutting length of hair. Further, the comb is configured when being attached in the second attachment position to the hair-cutting device to cause a second cutting length of hair. The first cutting length of hair is different from the second cutting length of hair.

Thus, the cutting length of hair to which the hair-cutting device reduces the length of the hair growing on the skin of the user can be adjusted by reversing the comb to interchange the first attachment position with the second attachment position.

According to another aspect of the invention, there is provided a hair-cutting device, which comprises a comb according to any of the previously described embodiments.

By providing a hair-cutting device with a comb as described in the previous aspects or embodiments, the essence of the invention can be best utilized to offer a hair-cutting device with more different cutting lengths than add-on elements.

In an embodiment of the invention, the hair-cutting device is a shaver, a trimmer or a groomer.

As hair-cutting device all appliances shall be understood, which can be customarily used to shave, cut, trim, clip or groom hair or beard of a user to a predefined length.

According to another aspect of the invention, there is provided a method of adapting a cutting length of a hair-cutting device with a comb according to any of the previously described embodiments. The method comprises the steps of detaching the comb from the hair-cutting device, rotating the comb around a virtual axis of the comb, and attaching the comb to the hair-cutting device.

By manually interchanging the first attachment position and the second attachment position of the comb, the cutting length of the hair-cutting device can be adjusted. This can be done by detaching the hair-cutting device from the first slot of the comb, turning the comb around a virtual axis and attaching the hair-cutting device to the second slot.

In an embodiment of the invention, rotating the comb is carried out by rotating the comb around a virtual axis that is part of an angle-bisecting plane of the first surface and of the second surface in order to interchange the first attachment position and the second attachment position.

The virtual axis, which can be used to rotate the comb around to come from a first attachment position to a second attachment position, is characterized by an identical distance of each point of the virtual axis from both, the first surface and the second surface. Further, the virtual axis is orthogonal to the common edge and intersects with the common edge at its center. This virtual axis can be seen in FIG. 2.

Advantageously, the benefits provided by any of the above aspects equally apply to all of the other aspects and vice versa.

The above aspects and embodiments will become apparent from and be elucidated with reference to the exemplary embodiments described hereinafter.

Exemplary embodiments of the invention will be described in the following with reference to the following drawings:

DETAILED DESCRIPTION OF THE EMBODIMENTS

Figure 1:
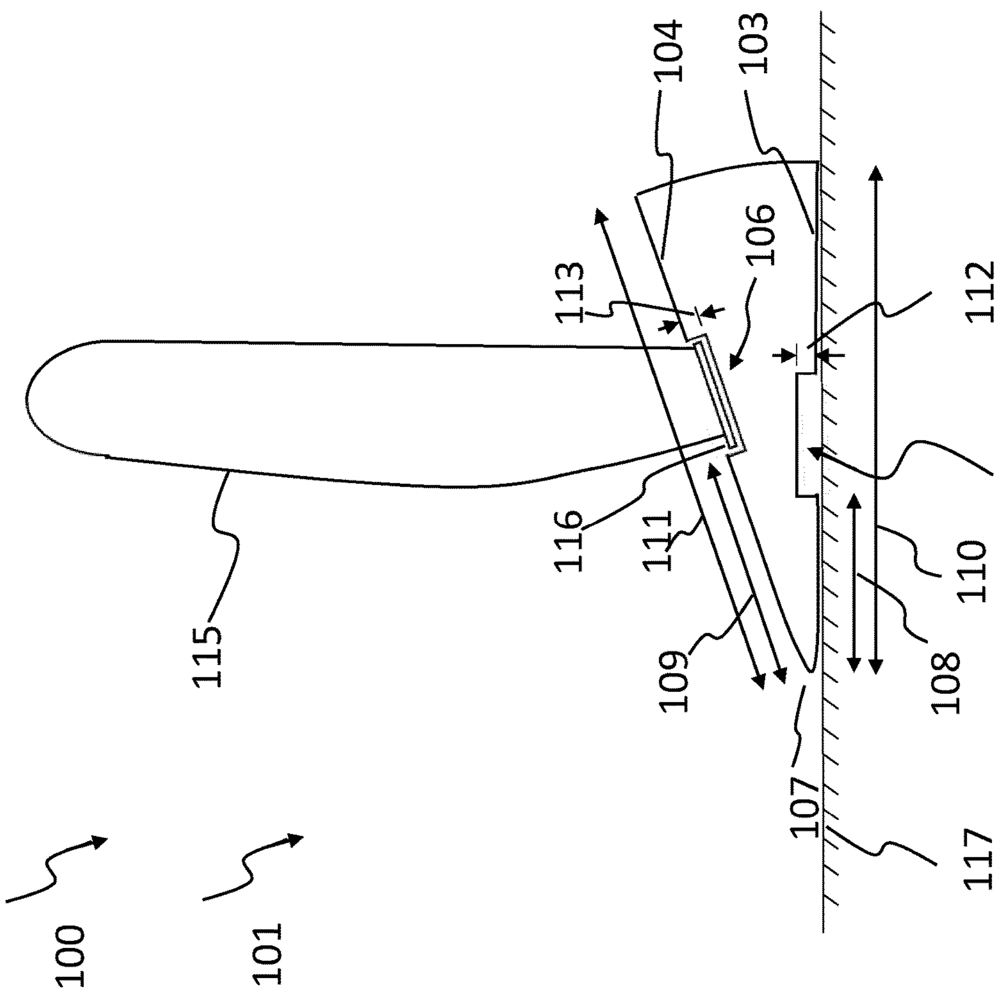
FIG. 1 shows a schematic set-up of a first exemplary embodiment of a comb in a first attachment position including a hair-cutting device.

FIG. 1 shows a schematic set-up of a first exemplary embodiment of a comb 100 in a first attachment position 101 including a hair-cutting device 115. The comb 100 is with the first surface 103, which is shown as bottom surface, in contact with the skin 117 of the user. The second surface 104, in this figure the top surface, has a common edge 107 with the first surface 103. The second surface comprises a second slot 106, which receives the cutting element 116 of the hair-cutting device 115, as the comb 100 is attached to the hair-cutting device 115 in this first attachment position 101. The first slot 105 at the first surface 103, which is in contact with the skin 117, is not used in this first attachment position 101. In this exemplary embodiment of the invention, the first distance 108 of the first slot 105 from the common edge 107 is smaller than the second distance 109 of the second slot 106 from the common edge 107. The first length 110 of the first surface 103 and the second length 111 of the second surface 104 are identical in this first exemplary embodiment. In addition, the first depth 112 of the first slot 105 and the second depth 113 of the second slot 106 are depicted with identical size.

Figure 2:
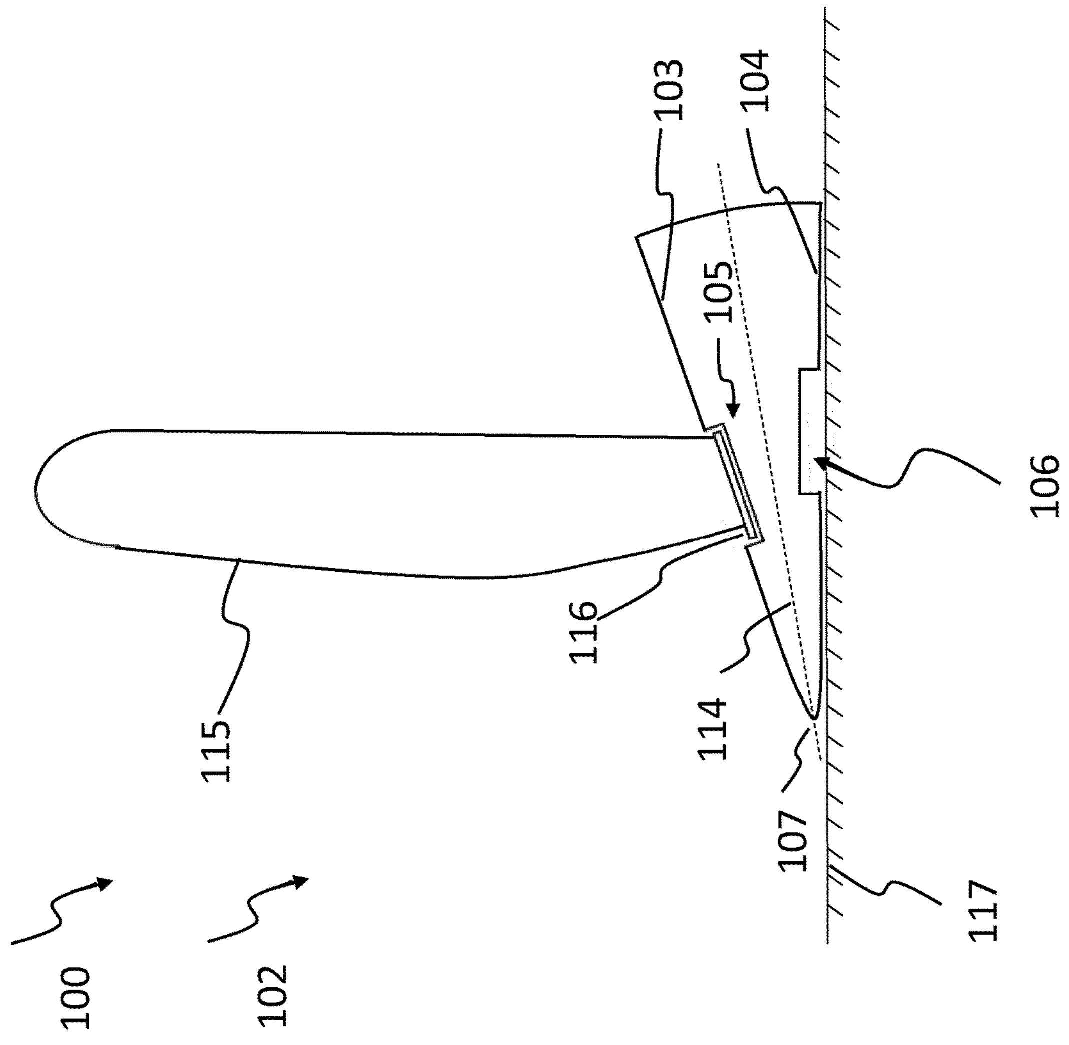
FIG. 2 shows a schematic set-up of the first exemplary embodiment of a comb in a second attachment position including a hair-cutting device.

FIG. 2 shows a schematic set-up of the first exemplary embodiment of a comb 100 in a second attachment position 102 including a hair-cutting device 115. Compared to the first attachment position 101 as shown in FIG. 1, the comb 100 is in the second attachment position 102 rotated around the virtual axis 114 by 180 degrees. The virtual axis 114 cuts with the common edge 107 and is part of the angle-bisecting plane of the first surface 103 and of the second surface 104. The rotation leads to an interchange of the first surface 103 and the second surface 104. In this second attachment position 102, the comb 100 is attached to the hair-cutting device 115 in a manner, that the cutting element 116 is receive by the first slot 105. The second slot 106 is not used in this second attachment position 102. The second surface 104 is in contact with the skin 117 of the user.

Figure 3A:
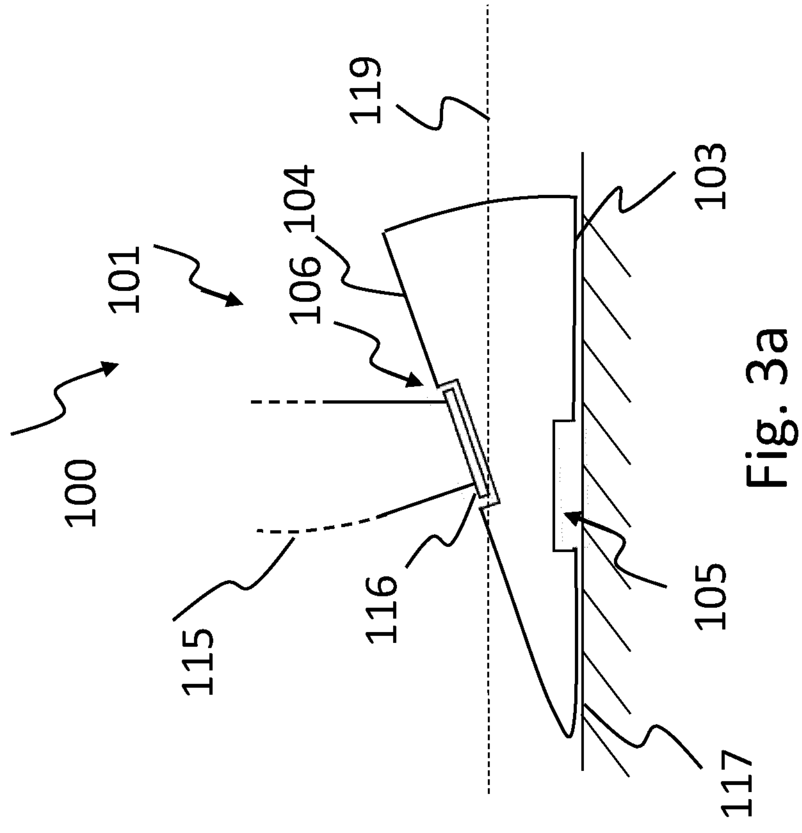
FIGS. 3*a* and 3*b* show a schematic set-up of the first exemplary embodiment of a comb in the first and in the second attachment position.
Figure 3B:
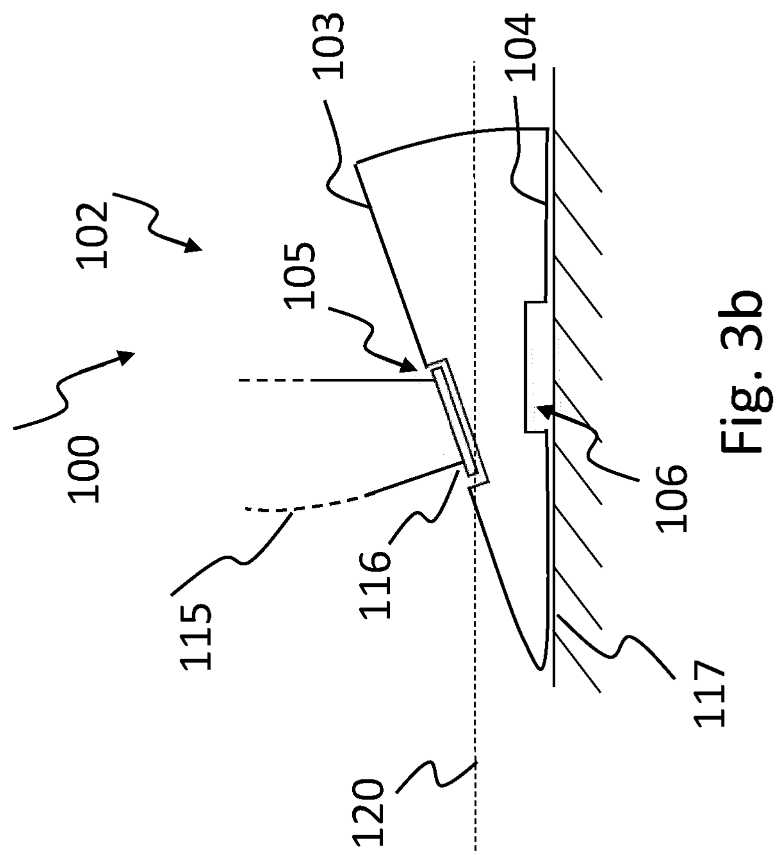

FIGS. 3*a* and 3*b* show a comparison of a schematic set-up of the first exemplary embodiment of a comb 100 in the first attachment position 101 in FIG. 3*a* and in the second attachment position 102 in FIG. 3*b*. The comb 100 is positioned in between of the hair-cutting device 115 and the skin 117 of the user. In the first attachment position 101, the first cutting length 119 of hair is defined as the distance of the cutting element 116 from the skin 117. In the second attachment position 102, the second cutting length 120 of hair is defined as the distance from the cutting element 116 from the skin 117. As can be seen, in this first exemplary embodiment, the first cutting length 119 is larger than the second cutting length 120.

Figure 4B:
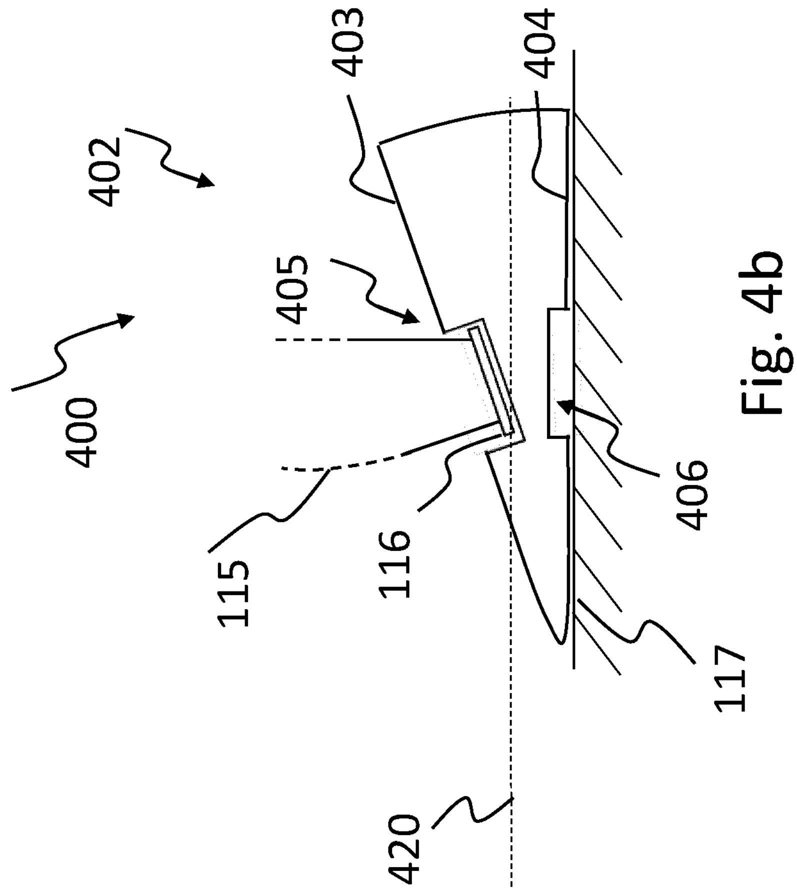
FIGS. 4*a* and 4*b* show a schematic set-up of a second exemplary embodiment of a comb in a first and in a second attachment position.
Figure 4A:
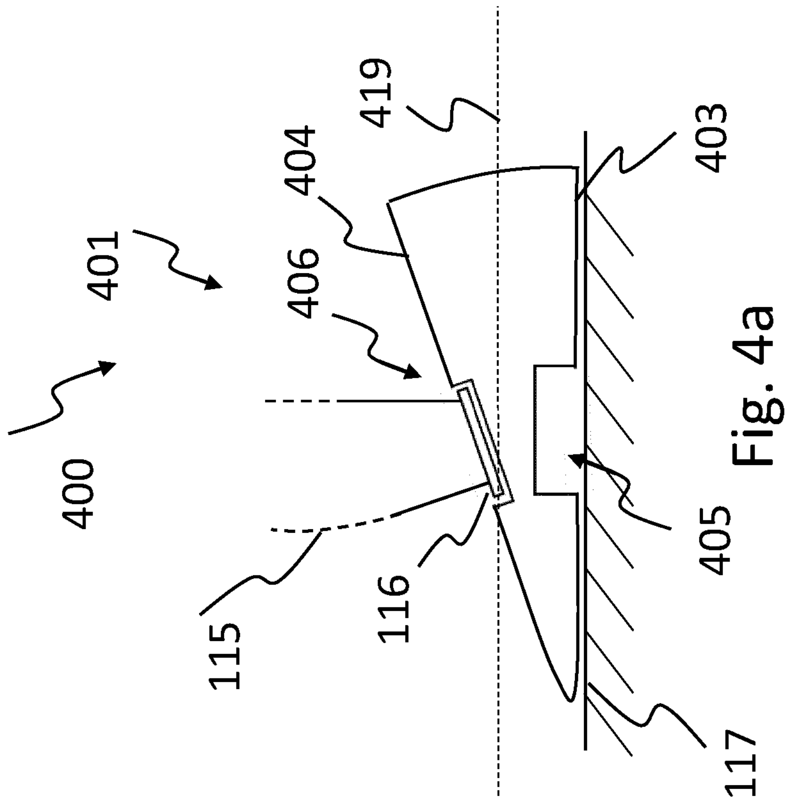

FIGS. 4*a* and 4*b* show a comparison of a schematic set-up of a second exemplary embodiment of a comb 400 in a first attachment position 401 in FIG. 4*a* and in a second attachment position 402 in FIG. 4*b*. The comb 400 is positioned in between of the hair-cutting device 115 and the skin 117 of the user. In this second exemplary embodiment of the invention, the distances of the first slot 405 to the common edge and of the second slot 406 to the common edge are identical. However, the depth of the second slot 406, which receives the cutting element 116 in the first attachment position 401, is smaller than the depth of the first slot 405, which is not used in this first attachment position 401. The first surface 403 is in contact with the skin 117. In the second attachment position 402 as shown in FIG. 4*b*, the first slot 405 receives the cutting element 116 and the second surface 404 is in contact with the skin 117. The different depths of the first slot 405 and of the second slot 406 result in different cutting lengths. In the first attachment position 401, the first cutting length 419 of hair is defined as the distance of the cutting element 116 from the skin 117. In the second attachment position 402, the second cutting length 420 of hair is defined as the distance from the cutting element 116 from the skin 117. In this second exemplary embodiment, the first cutting length 419 is larger than the second cutting length 420.

Figure 5B:
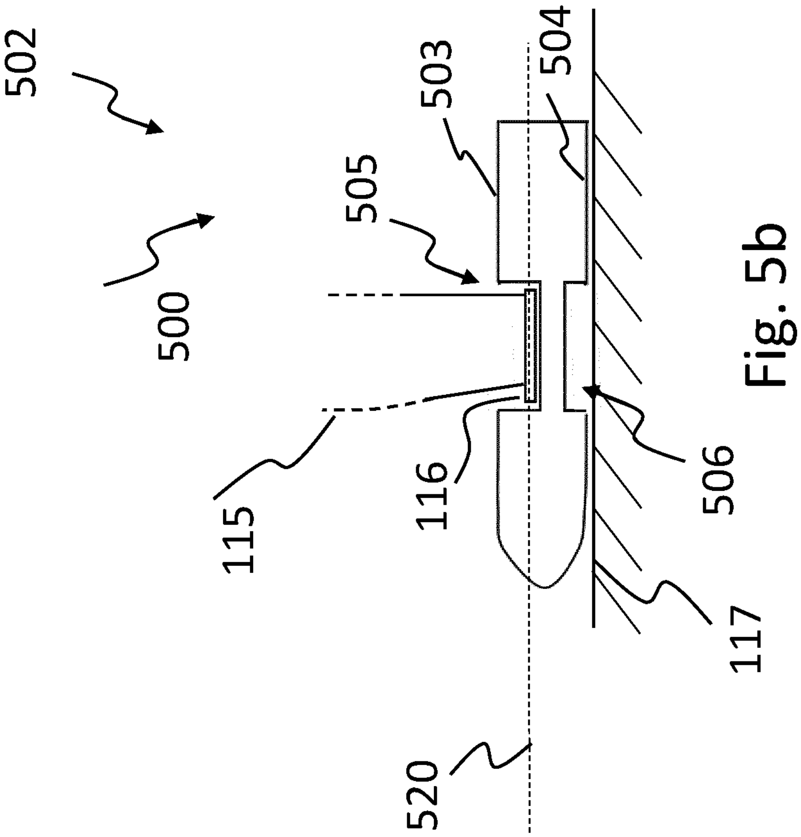
FIGS. 5*a* and 5*b* show a schematic set-up of a third exemplary embodiment of a comb in a first and in a second attachment position.
Figure 5A:
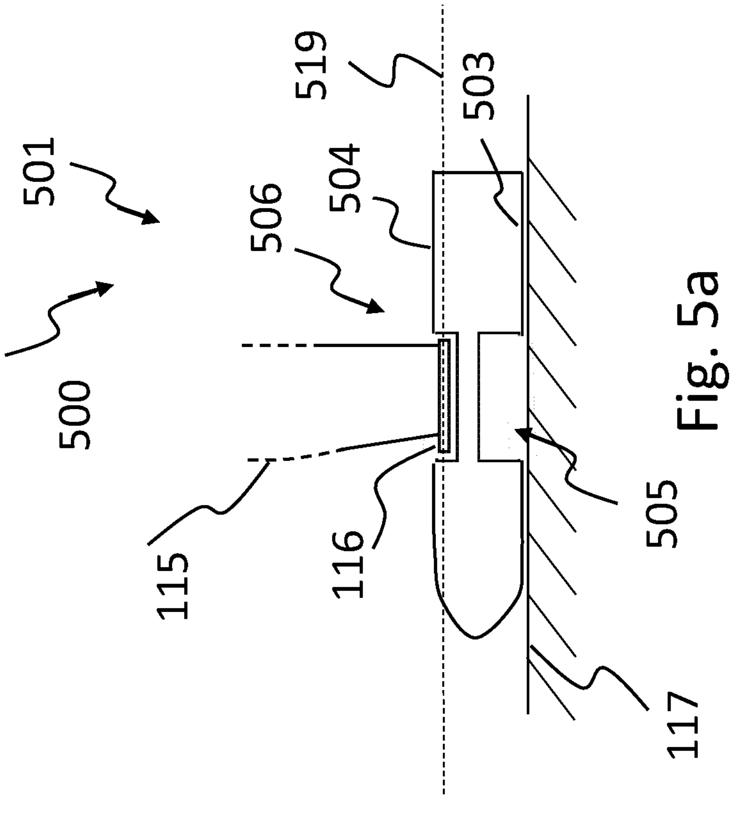

FIGS. 5*a* and 5*b* show a comparison of a schematic set-up of a third exemplary embodiment of a comb 500 in a first attachment position 501 in FIG. 5*a* and in a second attachment position 502 in FIG. 5*b*. The comb 500 is positioned in between of the hair-cutting device 115 and the skin 117 of the user. In this third exemplary embodiment of the invention, the first surface 503 and the second surface 504 are parallel to each other. The depth of the second slot 506, which receives the cutting element 116 in the first attachment position 501, is smaller than the depth of the first slot 505, which is not used in this first attachment position 501. The first surface 503 is in contact with the skin 117. In the second attachment position 502 as shown in FIG. 5*b*, the first slot 505 receives the cutting element 116 and the second surface 504 is in contact with the skin 117. The different depths of the first slot 505 and of the second slot 506 result in different cutting lengths. In the first attachment position 501, the first cutting length 519 of hair is defined as the distance of the cutting element 116 from the skin 117. In the second attachment position 502, the second cutting length 520 of hair is defined as the distance from the cutting element 116 from the skin 117. In this third exemplary embodiment, the first cutting length 519 is larger than the second cutting length 520.

Figure 6B:
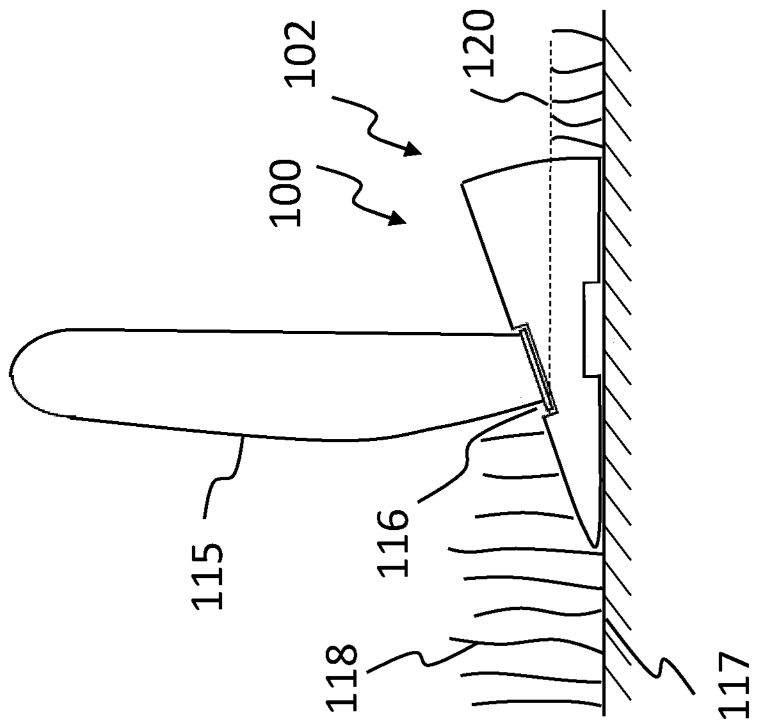
FIGS. 6*a* and 6*b* show a schematic set-up of the first exemplary embodiment of a comb in the first and in the second attachment position including a hair-cutting device with an illustration of the different cutting lengths of hair.
Figure 6A:
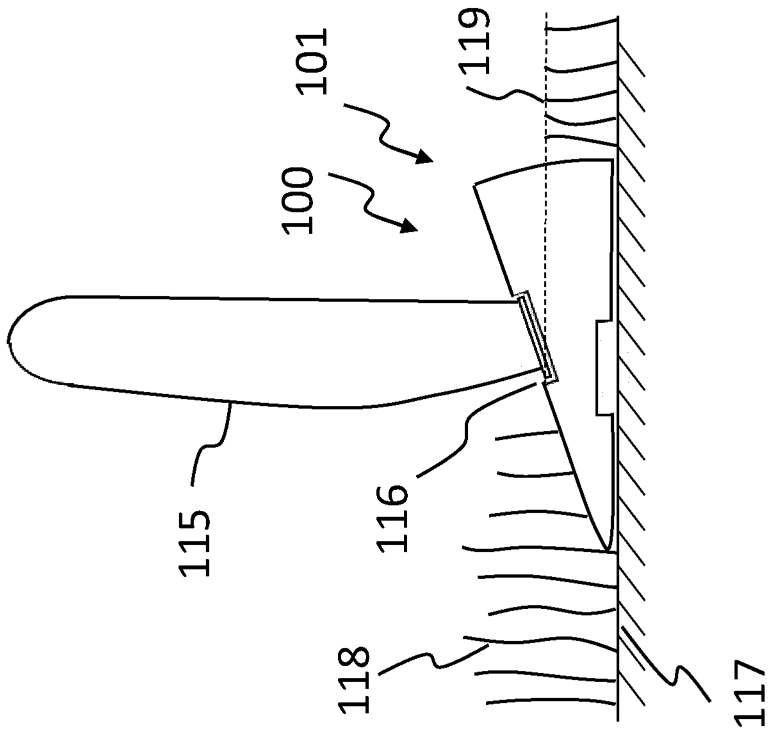

FIGS. 6*a* and 6*b* show a comparison of a schematic set-up of the first exemplary embodiment of a comb 100 in the first attachment position 101 in FIG. 6*a* and in the second attachment position 102 in FIG. 6*b* including a hair-cutting device 115 with an illustration of the different cutting lengths of hair 118. The comb 100 is positioned in between of the hair-cutting device 115 and the skin 117 of the user. The distance of the cutting element 116 from the skin 117 defines the cutting length of hair the hair 118. The first cutting length 119 in the first attachment position 101 shown in FIG. 6*a* is larger than the second cutting length 120 in the second attachment position 102 shown in FIG. 6*b*.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. The mere fact that certain measures are re-cited in mutually different dependent claims does not indicate that a combination of these measures cannot be used to advantage. Any reference signs in the claims should not be construed as limiting the scope.

LIST OF REFERENCE SIGNS

100, 400, 500 comb
101, 401, 501 first attachment position
102, 402, 502 second attachment position
103, 403, 503 first surface
104, 404, 504 second surface
105, 405, 505 first slot
106, 406, 506 second slot
107 common edge
108 first distance
109 second distance
110 first length
111 second length

112 first depth
113 second depth
114 virtual axis
115 hair-cutting device
116 cutting element
117 skin
118 hair
119, 419, 519 first cutting length
120, 420, 520 second cutting length

The invention claimed is:

1. A comb for being attached to a hair-cutting device, the comb comprising:

a first surface configured to be in contact with a skin of a user when the comb is attached to the hair-cutting device in a first attachment position, wherein the first surface comprises a first slot configured to receive a cutting element of the hair-cutting device when the comb is attached to the hair-cutting device in a second attachment position, a second surface configured to be in contact with the skin of the user when the comb is attached to the hair-cutting device in the second attachment position, and wherein the second surface comprises a second slot configured to receive the cutting element of the hair-cutting device when the comb is attached to the hair-cutting device in the first attachment position.

2. The comb according to claim 1, wherein the first surface and the second surface extend to define common edge, and wherein the common edge forms a tip of the comb.

3. The comb according to claim 2, wherein the first slot is positioned in the first surface of the comb with a first distance from the common edge, wherein the second slot is positioned in the second surface of the comb with a second distance from the common edge, and wherein the first distance is different from the second distance.

4. The comb according to claim 1, wherein the first slot has a first depth with respect to the first surface, wherein the second slot has a second depth with respect to the second surface, and wherein the first depth is equal to the second depth.

5. The comb according to claim 1, wherein the first slot has a first depth with respect to the first surface, wherein the second slot has a second depth with respect to the second surface, and wherein the first depth is different from the second depth.

6. The comb according to claim 1, wherein the comb has a wedge shape.

7. The comb according to claim 1, wherein the first surface is parallel to the second surface.

8. The comb according to claim 1, wherein the comb is configured when being attached in the first attachment position to the hair-cutting device to cause a first cutting length of hair, wherein the comb is configured when being attached in the second attachment position to the hair-cutting device to cause a second cutting length of hair, wherein the first cutting length of hair is different from the second cutting length of hair.

9. A hair-cutting device comprising a comb according to claim 1.

10. The hair-cutting device according to claim 9, wherein the hair-cutting device is a shaver, a trimmer or a groomer.

11. A method of adapting a cutting length of a hair-cutting device with a comb according to claim 1, the method comprising the steps:

detaching the comb from the hair-cutting device, rotating the comb around a virtual axis of the comb, and attaching the comb to the hair-cutting device.

12. The method according to claim 11, wherein rotating the comb is carried out by rotating the comb around a virtual axis that is part of an angle-bisecting plane of the first surface and of the second surface in order to interchange the first attachment position and the second attachment position.

* * * * *